United States Patent
Bang

(10) Patent No.: US 9,522,697 B2
(45) Date of Patent: Dec. 20, 2016

(54) CONTROL METHOD FOR ELECTROHYDRAULIC POWER STEERING SYSTEM

(71) Applicant: HYUNDAI MOTOR COMPANY, Seoul (KR)

(72) Inventor: Jin Seok Bang, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/872,085

(22) Filed: Sep. 30, 2015

(65) Prior Publication Data

US 2016/0152260 A1 Jun. 2, 2016

(30) Foreign Application Priority Data

Nov. 27, 2014 (KR) .................. 10-2014-0167081

(51) Int. Cl.
*B62D 5/065* (2006.01)
*B62D 5/14* (2006.01)

(52) U.S. Cl.
CPC .............. *B62D 5/065* (2013.01); *B62D 5/14* (2013.01)

(58) Field of Classification Search
CPC ............. B62D 5/065; B62D 5/18; B62D 5/14
See application file for complete search history.

(56) References Cited

U.S. PATENT DOCUMENTS

| 6,069,460 | A | 5/2000 | Grabowski et al. |
| 6,260,356 | B1 | 7/2001 | Baughn et al. |
| 7,164,978 | B2 | 1/2007 | Takaki et al. |
| 7,303,044 | B2 | 12/2007 | Lesther et al. |
| 8,880,263 | B2 * | 11/2014 | Aizawa ............ B60L 3/0023 180/65.285 |

FOREIGN PATENT DOCUMENTS

| JP | 2013-010380 A | 1/2013 |
| KR | 10-2010-0070914 A | 6/2010 |
| KR | 10-2012-0018508 A | 3/2012 |
| KR | 10-2012-0097024 A | 9/2012 |
| KR | 10-1195728 B1 | 10/2012 |
| KR | 10-1349464 B1 | 1/2014 |

* cited by examiner

*Primary Examiner* — Kevin Hurley
(74) *Attorney, Agent, or Firm* — McDermott Will & Emery LLP

(57) ABSTRACT

An electrohydraulic power steering system includes a sensor for detecting steering information, a motor pump unit generating a hydraulic pressure for assisting steering power depending on a driver's steering wheel operation, and a hydraulic cylinder driven with the hydraulic pressure supplied from the motor pump unit to assist the steering power. A control method of the electrohydraulic power steering system includes acquiring steering angle information depending on the driver's steering operation and information on a steering torque applied through a steering wheel at the time of operating the steering wheel; determining a target steering torque depending on the acquired steering angle; and variably controlling a motor rotational speed of the motor pump unit so that the steering torque acquired through the sensor satisfies the target steering torque.

11 Claims, 5 Drawing Sheets

US 9,522,697 B2

CONTROL METHOD FOR ELECTROHYDRAULIC POWER STEERING SYSTEM

CROSS-REFERENCE TO RELATED APPLICATION

This application claims under 35 U.S.C. §119(a) the benefit of Korean Patent Application No. 10-2014-0167081, filed on Nov. 27, 2014 with the Korean Intellectual Property Office, the entire contents of which are incorporated herein by reference.

TECHNICAL FIELD

The present disclosure relates to a control method for a steering system of a vehicle, and more particularly, to a control method for an electrohydraulic power steering system which can prevent a sense of difference or a catching sense due to variations in driving conditions of the vehicle.

BACKGROUND

Often, a steering system of a vehicle which decreases a driver's operational steering wheel force to enable light and rapid steering operation uses hydraulic pressure to generate forces for assisting the steering power of the driver, also known as steering assistance power.

A hydraulic power steering system may include a power steering pump driven by the rotational power of an engine.

At stopping or at a low speed at which the friction force of a vehicle's tires is large, a rate of flow discharged from the pump must increase to generate large steering assistance power. Similarly, at a medium/high speed at which the friction force of the tire is small and safety is important, the rate of flow discharged from the pump must decrease to generate relatively low steering assistance power.

However, the power steering pump used in the hydraulic power steering system discharges a greater rate of flow at medium-high speeds than at low speeds due to the power steering pump rotating in direct proportion to an engine RPM. In such a situation, power (fuel efficiency) is lost.

Further, since the hydraulic power steering system cannot be electronically controlled, there are limitations on steering performance.

For example, when a steering operation is made to be lighter than at a normal time by compensating the steering power at a low-speed section, a convenient steering performance is possible, but the hydraulic power steering system in the related art cannot be controlled according to the vehicle speed.

To overcome the disadvantage, a vehicle speed sensitive motor driven power steering (MDPS), a system that assists steering only by torque of a motor without using the hydraulic pressure, has been developed and adopted. Such a system may change the steering power according to a driving vehicle speed.

The MOPS system is primarily mounted on a sedan in order to achieve a fuel efficiency improvement of the vehicle, since the hydraulic power steering system in the related art drives the power steering pump (hydraulic pump) by using the rotational power of the engine, and thus the engine power is unnecessarily consumed at all times. However, since the MDPS system consumes only the required energy at the moment when a steering performance is required by controlling the motor, the MDPS can contribute to a fuel efficiency improvement of the vehicle.

However, since a commercial vehicle such as a large-sized sedan or a truck has a larger weight than a general sedan, it is difficult to acquire required steering power only by the motor. As a result, an electrohydraulic power steering (EHPS) system that assists the steering power by using the hydraulic pressure generated by driving the hydraulic pump with the motor has been widely used.

FIG. 1 is a perspective view illustrating a general EHPS system and illustrates a steering wheel 1 for the steering operation, a steering angle sensor (SAS) 2 detecting a steering angle depending on a steering wheel operation (driver's input), a steering column universal joint 4, a motor pump unit (MPU) 5 generating and supplying the hydraulic pressure for assisting the steering power, a reservoir 6 storing steering oil and a gear box 7 performing vehicle steering using a driver's steering power transferred through the steering column 3 as well as the steering assistance power by the hydraulic pressure.

FIG. 2 is a configuration diagram schematically illustrating a configuration of the EHPS system in the related art. When the driver operates the steering wheel 1, a rack and pinion mechanism unit 8 converts rotational power transferred from the steering column 3 into a linear motion.

The rack and pinion mechanism unit 8 includes a rack gear 10 formed on a rack bar and a pinion gear 11 transferring power in abutment with the rack gear 10. When the driver rotates the steering wheel 1, rotational power is transferred to the pinion gear 11 through the steering column 3 and the transferred rotational power is converted into linear power by the pinion gear 11 and the rack gear 10 which moves the rack bar 9 linearly.

A motor pump unit 5 is driven and controlled according to a control signal output by an electric control unit (ECU), or, a steering controller 20, to generate and supply hydraulic pressure. The hydraulic pressure supplied by the motor pump unit 5 is supplied to a hydraulic cylinder 12 through a steering valve 15 controlling oil supply.

The hydraulic cylinder 12 assists the linear motion of the rack bar 9 by actuating the hydraulic pressure to generate the steering assistance power, and the steering valve 15 controls the flow of oil supplied to the hydraulic cylinder 12.

Reference numeral 14a represents an oil supply line to which oil is supplied by the motor pump unit 5, while reference numeral 14b represents an oil return line for returning oil to an oil reservoir 6. Reference numeral 13 represents a pressure relief valve (PRV).

In the EHPS system in the related art, the steering controller 20 controls a pump rotational speed (rpm) of the motor pump unit 5 based on a signal (vehicle speed signal) of a vehicle speed sensor and a signal (steering angle signal) of the steering angle sensor 2 to generate steering assistance power.

In this case, information regarding a steering angle (deg) depending on a steering wheel operation of a driver and a steering angular speed (deg/s) acquired by a differential value of the steering angle may be acquired from the signal of the steering angle sensor 2. The steering controller 20 controls the motor of the motor pump unit 5 based on the vehicle speed and the steering angular speed.

FIG. 3 is a flowchart illustrating a generation process of steering power (steering assistance power) of the EHPS system and FIG. 4 is a diagram illustrating one example of a map for a motor control of the motor pump unit.

First, when the vehicle speed detected by the vehicle speed sensor is input in the steering controller 20 while the vehicle is driven and a steering input is made by operating the steering wheel 1 by the driver (S1), the steering controller 20 acquires the steering angular speed based on the driver's steering input (steering wheel operation) from the signal of the steering angle sensor 2 (S2).

In this case, a motor rotational speed may be acquired from a map having the vehicle speed and the steering angular speed as inputs. The map may be a 3D map (motor RPM 3D map) in which the rotational speed is set as a value depending on the vehicle speed and the steering angular speed. In a vehicle development step, the map is prepared through an advance research and tuning process and thereafter, pre-stored in the steering controller of a produced vehicle.

Further, the steering controller 20 acquires the motor rotational speed of the motor pump unit 5 from the vehicle speed and the steering angular speed, driving motor M is controlled according to the acquired rotational speed (S3), and the motor pump unit 5 generates and supplies the hydraulic pressure (S4).

Consequently, while the hydraulic cylinder of the gear box is driven by the hydraulic pressure supplied from the motor pump unit (S5), the power generated assists the driver steering power depending on the steering wheel operation (S6).

Meanwhile, in the EHPS system in the related art, since a logic (passive boost logic) for controlling the motor rotational speed is applied only according to the vehicle speed and the steering angular speed as described above, even though a vehicle load increases or a slip moment increases due to low tire air pressure, the motor rotational speed is constant under conditions of the vehicle speed and the steering angular speed.

However, in this case, since a vehicle speed influences the motor rotational speed, the steering power of the driver increases.

As described above, in the EHPS system in the related art, since driving of the motor pump unit is controlled by a predetermined motor rotational speed only according to the vehicle speed and the steering angular speed, the steering power of the driver actually required may vary according to driving conditions such as a vehicle state, a road surface condition, aerodynamics acting on the vehicle, and the like. Consequently, a constant steering sense cannot be maintained in the steering wheel operation and the driver can feel a sense of difference or a catching sense.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with prior art.

The present disclosure has been made in an effort to provide a control method for an electrohydraulic power steering system which can prevent a sense of difference or a catching sense due to variation in driving conditions (a vehicle state, a road condition, an aerodynamics, and the like) of the vehicle and improve steering performance by maintaining a steering sense at a predetermined level.

In one aspect, the present disclosure provides a control method for an electrohydraulic power steering system including a sensor for detecting steering information, a motor pump unit generating a hydraulic pressure for assisting steering power depending on a driver's steering wheel operation, and a hydraulic cylinder driven with the hydraulic pressure supplied from the motor pump unit to assist the steering power, which may include: acquiring steering angle information from the driver's steering operation and acquiring information on a steering torque applied through a steering wheel at the time of operating the steering wheel; determining a target steering torque from the acquired steering angle; and variably controlling a motor rotational speed of the motor pump unit so that the steering torque acquired through the sensor satisfies the target steering torque.

As a result, the control method for an electrohydraulic power steering system of the present disclosure is unlike related art that controls motor driving of a motor pump unit at a predetermined rotational speed (rpm) in accordance with a vehicle speed and a steering angular speed. Instead, since steering power is maintained by controlling a motor rotational speed based on a target steering torque so as to overcome a problem caused due to causes that influences driver's steering power, such as a vehicle state such as a vehicle load or a tire air pressure, a road surface condition, aerodynamics, and the like, a driver can feel a steering sense at a predetermined level and the driver does not feel a sense of difference or a catching sense while operating a steering wheel to improve steering performance.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example vehicles that are powered by both electrical and gasoline.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
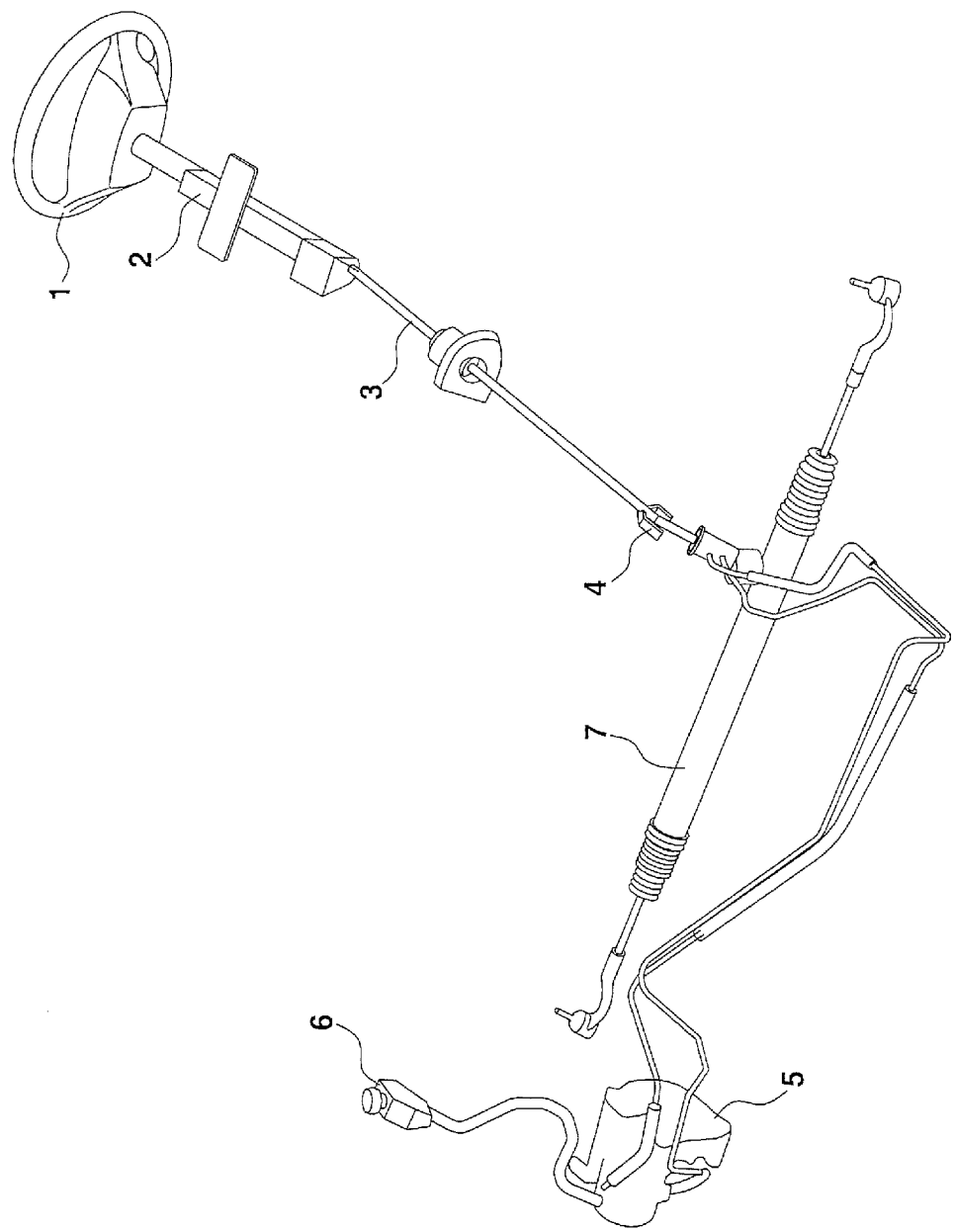
FIG. 1 is a perspective view illustrating a general EHPS system.
Figure 2:
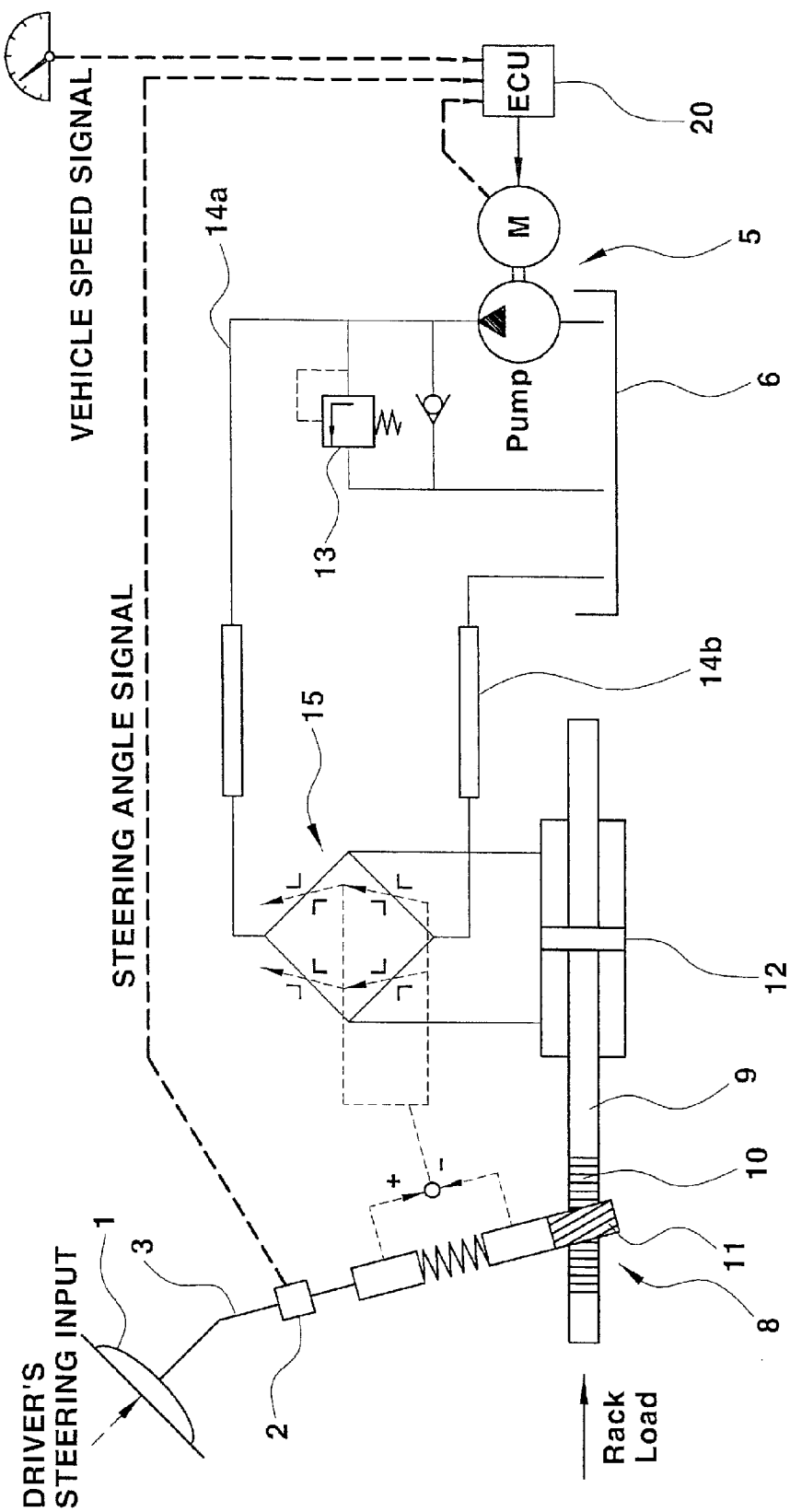
FIG. 2 is a configuration diagram schematically illustrating a configuration of the EHPS system in the related art.
Figure 3:
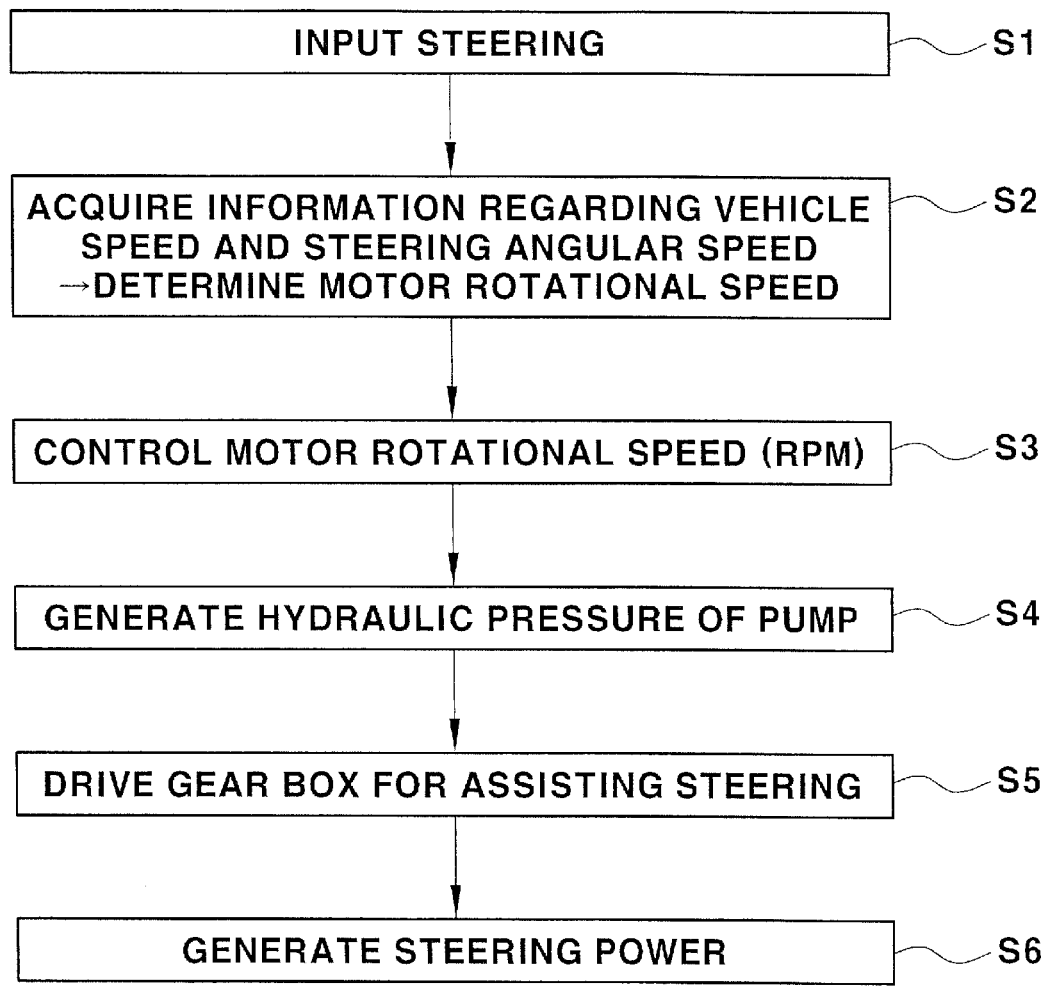
FIG. 3 is a flowchart illustrating a generation process of steering power (steering assistance power) of the EHPS system in the related art.
Figure 4:
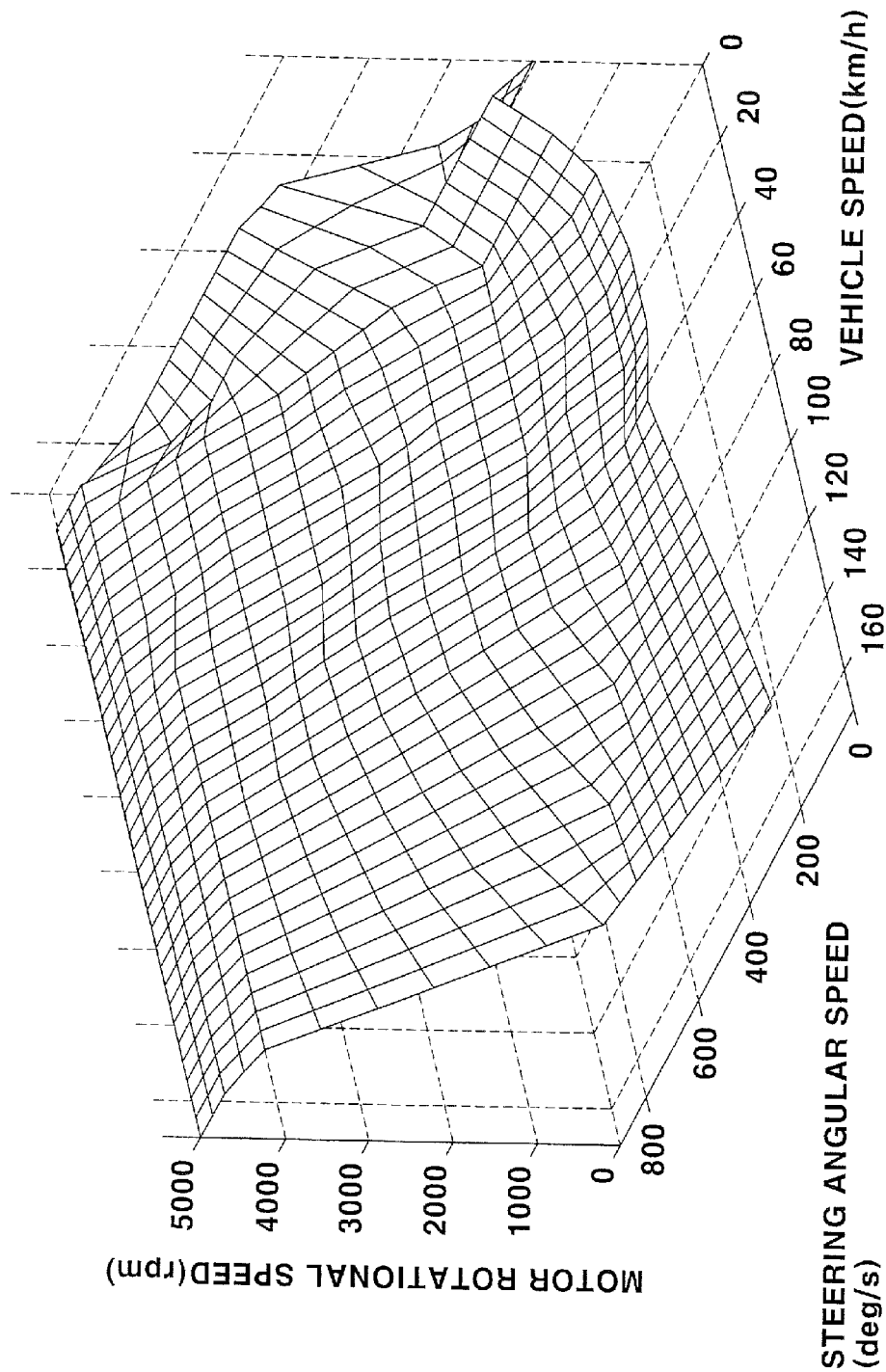
FIG. 4 is a diagram illustrating one example of a map for a motor control of a motor pump unit in the related art.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, exemplary embodiments of the present disclosure will be described in detail with reference to the accompanying drawings, so as to be easily implemented by those skilled in the art.

The present disclosure has been made in an effort to provide a control method for an electrohydraulic power steering system which can prevent a sense of difference or a catching sense due to variation in driving conditions (a vehicle state, a road condition, an aerodynamics, and the like) of the vehicle and improve steering performance by maintaining a steering sense at a predetermined level.

To this end, a control method is presented using an active boot logic to control a motor rotational speed of a motor pump unit for generating a hydraulic pressure based on a target steering torque.

The present disclosure has a primary characteristic in that, unlike related art that controls motor driving of a motor pump unit at a predetermined rotational speed (rpm) in accordance with a vehicle speed and a steering angular speed, a motor rotational speed is controlled based on a target steering torque to overcome a problem that influences driver's steering power, such as a vehicle state such as a vehicle load or a tire air pressure, a road surface condition, aerodynamics, and the like.

Figure 5:
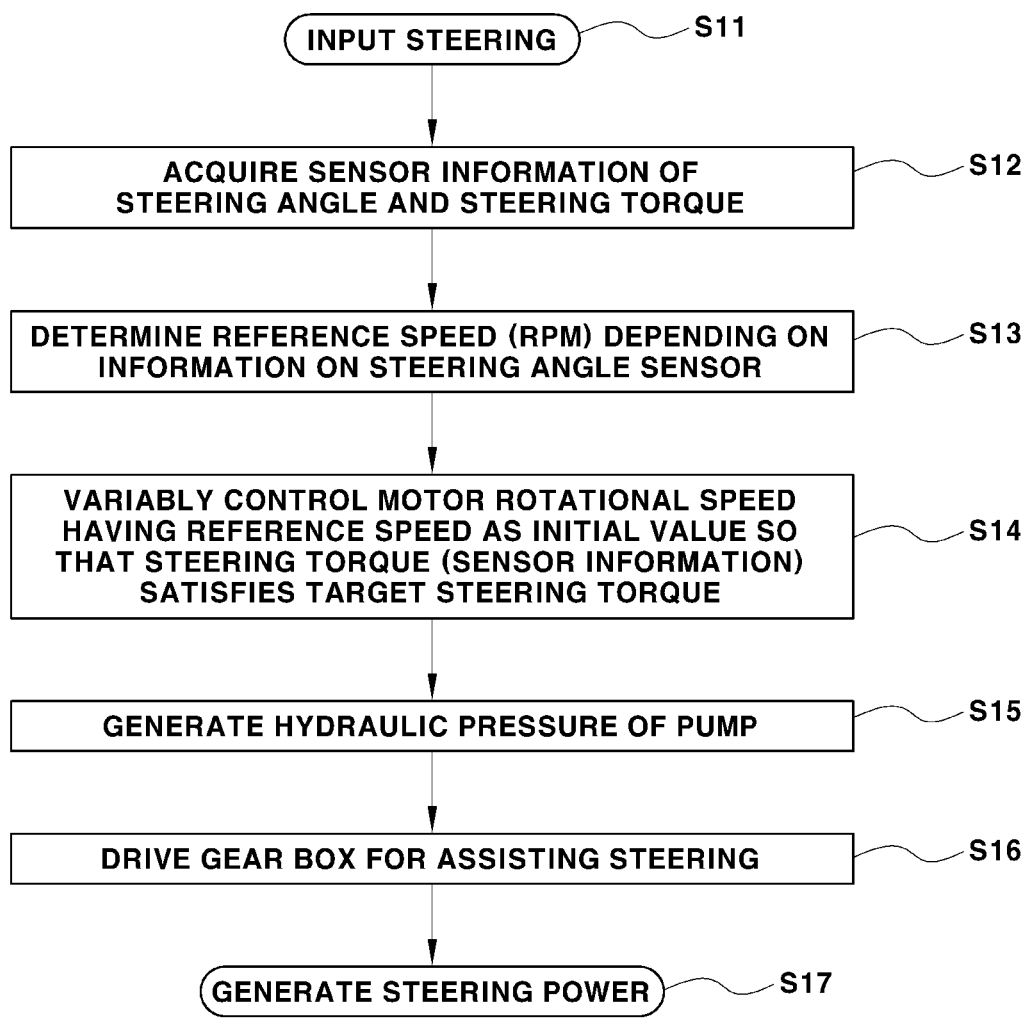
FIG. 5 is a flowchart illustrating a control method of an EHPS system according to the present disclosure.

FIG. 5 is a flowchart illustrating a control method of an EHPS system according to the present disclosure.

First, in the present disclosure, when there is a steering input (steering wheel operation) of a driver (S11), a controller acquires steering information depending on the steering input (S12).

The steering information may include a steering angle, which is a rotational angle of a steering wheel, and a steering torque, which is a torque (steering wheel torque) applied through the steering wheel when the driver operates the steering wheel.

The steering angle in the steering information may be detected through a steering angle sensor (SAS) and the steering torque may be detected through a torque only sensor (TOS).

Alternatively, a torque and angle sensor (TAS) may be used as a sensor for detecting the steering angle and the steering torque.

Hereinafter, an example using the torque and angle sensor (TAS) that detects both the steering angle and the steering torque while driver's steering will be described.

In the present disclosure, sensor signals, that is, a steering angle signal and a steering torque signal input from the torque and angle sensor (hereinafter, referred to as 'TAS'), are used to control driving of the motor pump unit, specifically, the motor driving of the motor pump unit.

The active boost logic to control the motor rotational speed based on the target steering torque is applied to control a steering sense reflected by an influence of the vehicle state or the driving condition, such as the road surface condition, aerodynamics, and the like, which is used to control the rotational speed (rpm) of the motor for a hydraulic control for generating steering power.

In the present disclosure, a controller determines the target steering torque depending on the steering angle detected through the TAS and controls the motor rotational speed so that the steering toque detected through the TAS satisfies the target steering torque.

In order to control the present disclosure, an entire steering angle range in which the driver steering input (steering wheel operation) is possible is divided into a plurality of steering angle sections, that may include, center, middle and end sections to be preset in the controller.

For example, the steering angle section may be divided into three sections as described below.

Center Section: $-10°\leq$ steering angle $\leq 10°$
Middle Section: $-580°\leq$ steering angle$<-10°$ and $10°<$ steering angle$\leq 580°$
End Section: $-600°\leq$ steering angle$<-580°$, and $580°<$ steering angle$\leq 600°$ Wherein, a + value means a steering wheel left turn (LH turn) and a − value means right turn (RH turn) (may be opposite thereto).

When 10 is a first set angle, 580 is a set angle, and 600 is a third set angle, in the case where the steering angle is in the range of 0° to the first set angle based on an absolute value, the steering angle may be in the center section. Where the steering angle is in the range in which the steering angle is more than the first set angle and equal to or less than the second set angle, the steering angle may be in the middle section. Where the steering angle is in the range in which the steering angle is more than the second set angle and equal to or less than the third set angle which is a steering wheel full turn value, the steering angle may be in the end section.

Of course, the respective set values of 10, 580, and 600 are just examples, and the present disclosure is not limited thereto and the respective set values may be modified.

Further, a reference speed used as an initial value for controlling the motor rotational speed may be preset in the controller with respect to each steering angle section and the set example of the reference speed is as follows.

Center section: 2000 rpm (first reference speed)
Middle section: 3500 rpm (second reference speed)
End section: 2500 rpm (third reference speed)

The respective reference speeds of 2000, 3500, and 2500 are just examples, and the present disclosure is not limited thereto and the respective reference speeds may also be modified.

The target steering torque is preset in the controller with respect to each steering angle section and, the target steering torque may be set to be greater in the center section than in the middle section and the target steering torque may be set to be lower in the end section than in the middle section.

The target steering torque may be set to a predetermined value in the middle section.

As a result, in the present disclosure, when there is a steering input by the driver (S11), the controller determines the steering angle section from the steering angle signal input from the sensor for detecting the steering information (the TAS) and determines the reference speed (rpm) and the target steering torque (Nm) depending on each steering angle section.

When the reference speed and the target steering torque are determined, the motor rotational speed (rpm) is controlled to become the reference speed and thereafter, the motor rotational speed is variably controlled based on the reference speed so that the steering torque detected through the TAS satisfies the target steering torque (S13 and S14).

In this case, by increasing the motor rotational speed when the steering torque (TAS sensing value) applied through the steering wheel by the driver is greater than the target steering torque, the hydraulic pressure generated in the pump is increased, and the steering assistance power generated by the hydraulic cylinder is increased accordingly.

On the contrary, by decreasing the motor rotational speed when the steering torque is lower than the target steering torque, the hydraulic pressure generated in the pump is decreased the steering assistance power generated by the hydraulic cylinder is decreased.

Consequently, the motor rotational speed is controlled to satisfy the target steering torque. As a result, the motor pump unit generates a pump hydraulic pressure required for assisting the steering power (S15). While the hydraulic cylinder is driven by supplying the hydraulic pressure generated and controlled by the motor pump unit (S16), power generated assists the driver's steering power depending on the steering wheel operation (S17).

As described above, by variably controlling the motor rotational speed based on the target steering torque, a sense of steering difference or a catching sense may be prevented from occurring due to causes that influences driver's steering power. Such causes may include a vehicle state such as a vehicle load or a tire air pressure, a road surface condition, aerodynamics, and the like and steering performance may be improved by maintaining a predetermined level of steering sense.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A control method for an electrohydraulic power steering system including a sensor for detecting steering information, a motor pump unit generating a hydraulic pressure for assisting steering power depending on a driver's steering wheel operation, and a hydraulic cylinder driven with the hydraulic pressure supplied from the motor pump unit to assist the steering power, the method comprising:
   acquiring steering angle information from the driver's steering operation and acquiring information on a steering torque applied through a steering wheel at the time of operating the steering wheel;
   determining a target steering torque from the acquired steering angle; and
   variably controlling a motor rotational speed of the motor pump unit such that the steering torque acquired through the sensor satisfies the target steering torque.

2. The method of claim 1, wherein an entire steering angle range of steering wheel operation is divided into a plurality of determined steering angle sections and the target steering torque is preset for each steering angle section, and
   when determining the target steering torque, the target steering torque of the steering angle section to which the steering angle acquired through the sensor is determined.

3. The method of claim 2, wherein the divided steering angle section is divided into:
   a center section corresponding to a steering angle range of 0° to a first set angle based on an absolute value of the steering angle,
   a middle section corresponding to a steering angle range greater than the first set angle and equal to or less than a second set angle, and
   an end section corresponding to a range greater than the second set angle and equal to or less than a third set angle, which is a steering full turn value.

4. The method of claim 3, wherein the target steering torque is set to be greater in the center section than in the middle section, and
   the target steering torque is set to be lower in the end section than in the middle section.

5. The method of claim 3, wherein the target steering torque is set to a predetermined value in the middle section.

6. The method of claim 4, wherein the target steering torque is set to a predetermined value in the middle section.

7. The method of claim 2, wherein a reference speed is preset with respect to each steering angle, and
   when controlling the motor rotational speed of the motor pump unit, the motor rotational speed is variably controlled such that the steering torque acquired by the sensor satisfies the target steering torque by using the reference speed for each steering angle section as an initial value for controlling the motor rotational speed.

8. The method of claim 1, wherein when variably controlling the motor rotational speed of the motor pump unit so as to satisfy the target steering torque, a hydraulic pressure generated in the motor pump unit is increased by increasing the motor rotational speed when the steering torque acquired by the sensor is greater than the target steering torque.

9. The method of claim 7, wherein when variably controlling the motor rotational speed of the motor pump unit so as to satisfy the target steering torque, a hydraulic pressure generated in the motor pump unit is increased by increasing the motor rotational speed when the steering torque acquired by the sensor is greater than the target steering torque.

10. The method of claim 1, wherein when variably controlling the motor rotational speed of the motor pump unit so as to satisfy the target steering torque, the hydraulic pressure generated in the motor pump unit is decreased by decreasing the motor rotational speed when the steering torque acquired by the sensor is lower than the target steering torque.

11. The method of claim 7, wherein when variably controlling the motor rotational speed of the motor pump unit so as to satisfy the target steering torque, the hydraulic pressure generated in the motor pump unit is decreased by decreasing the motor rotational speed when the steering torque acquired by the sensor is lower than the target steering torque.

* * * * *